United States Patent
Vogler

(12) 
(10) Patent No.: US 6,393,127 B2
(45) Date of Patent: *May 21, 2002

(54) METHOD FOR TRANSFERRING AN ENCRYPTION KEY

(75) Inventor: Dean H. Vogler, Algonquin, IL (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,397

(22) Filed: Mar. 2, 1998

(51) Int. Cl.$^7$ ................................................ H04L 9/06
(52) U.S. Cl. ...................... 380/283; 380/284; 380/285
(58) Field of Search ................................ 380/283, 284, 380/285, 282

(56) References Cited

U.S. PATENT DOCUMENTS

| | | | |
|---|---|---|---|
| 4,649,233 A | * 3/1987 | Bass et al. | 380/21 |
| 5,241,599 A | * 8/1993 | Bellovin et al. | 380/21 |
| 5,651,066 A | * 7/1997 | Moriyasu et al. | 380/21 |
| 5,706,348 A | * 1/1998 | Gray et al. | 380/21 |
| 5,841,864 A | * 11/1998 | Klayman et al. | 380/21 |
| 5,909,491 A | * 6/1999 | Luo | 380/21 |

OTHER PUBLICATIONS

Schneier, Bruce, Applied Cryptography, 1996 pp. 15–17.*

* cited by examiner

Primary Examiner—Gilberto Barron, Jr.
Assistant Examiner—Douglas J. Meislahn
(74) Attorney, Agent, or Firm—Raymond J. Warren; Steven R. Santema

(57) ABSTRACT

Encryption keys are transferred by obtaining a public and private key pair (42, 65) from a source device (21, 61). The public key is transmitted (42, 65) from the source device (43, 66) to a target device (23, 62). The target (23, 62) obtains a traffic key (44, 67) stored within the target device (23, 62). The traffic key is encrypted (45, 68) within the target device using the public key. The encrypted traffic key is transmitted to the source device (46, 69) where it is decrypted (47, 70) using the private key. The replacement encryption key(s) is(are) encrypted using the traffic key by the source device (48, 71) forming an encrypted replacement key message which contains a target slot identification for each of the replacement encryption keys. The encrypted replacement key message is transmitted to the target device (49, 72) where the replacement encryption key(s) is(are) recovered (50, 73). The replacement encryption key(s) is(are) then stored at the target device in an identified target slot (51). The public, private, and traffic keys may then be erased from the source and target devices as appropriate.

17 Claims, 3 Drawing Sheets

-PRIOR ART

METHOD FOR TRANSFERRING AN ENCRYPTION KEY

FIELD OF THE INVENTION

The present invention relates, in general, to secure communication, and, more particularly, to the transfer of encryption keys for secure communications.

BACKGROUND OF THE INVENTION

In order to provide secure communications between devices, it is generally necessary to utilize some form of encryption. Various types of encryption techniques are available in the marketplace. These different techniques all have the same basic premise that both ends of the communication have knowledge of the encryption key being used by the other.

From time-to-time, it becomes necessary to change the encryption keys so that the secure communications will not be compromised over time by an eavesdropper. Presently, a source device, such as a Key Variable Loader (KVL) manufactured by Motorola Inc. is utilized to change the encryption keys in various target devices. These target devices include any device that utilizes encryption (e.g. radio base stations, mobile and portable radios, and console interface unit, and digital interface unit used in communication systems). A source device, such as the KVL, is generally coupled to the target device by some form of wireline, such as a cable. The direct connect enables the KVL to communicate with the source device directly. As a result, the new encryption keys being transferred are transferred in the clear (i.e. not encrypted) to the target devices.

However, since the KVL is designed to work with a variety of equipment, the cable connection requires that availability of a number of cables to be able to interface with the different target equipment. Therefore, a need exists to provide a device and system that does not require the myriad of cables necessary to service the various target equipment. A solution to this is to use a wireless interconnect such as an infra-Red (IR) connection or a Radio Frequency (RF) connection to transfer the data. Using a wireless means to transfer the data can leave the transfer open to intercept and can result in the encryption key transfer process being compromised. Therefore, a need exists for the ability to transfer replacement encryption keys over a wireless connection to the targets in a secure manner.

DETAILED DESCRIPTION OF THE DRAWINGS

Figure 1:
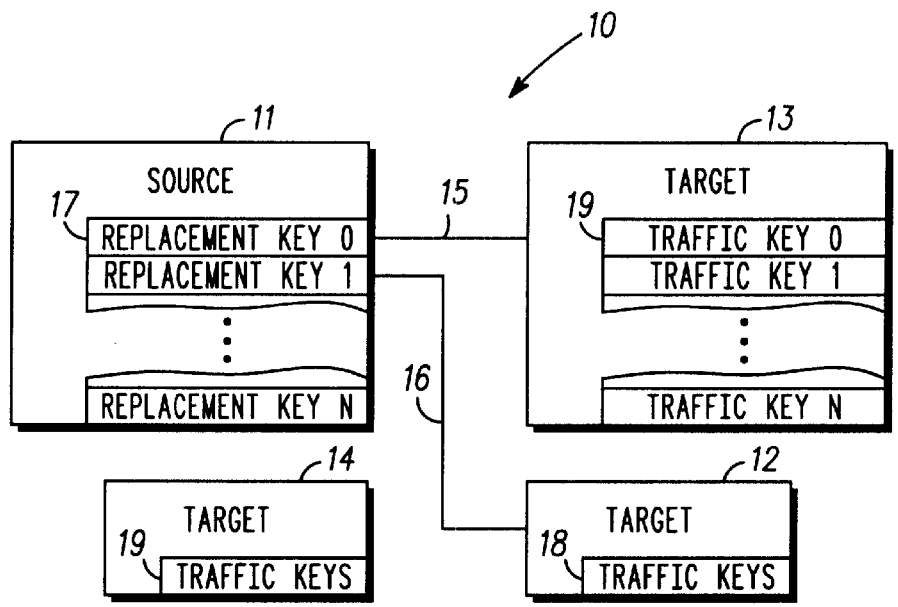
FIG. 1 is a prior art block diagram of system used to update encryption keys between a source device and a target device.

Referring initially to FIG. 1, a prior art block diagram of a system, generally designatea 10, used to update encryption keys is illustrated. System 10 basically consists of a source 11, a target 13, and a wireline connection 15 extending between source 11 and target 13. Source 11 will contain one or more replacement keys 17. Target 13 will contain one or more traffic keys 19, which are used for session keys during communication transfers. Once source 11 is connected to target 13 over wireline 15, the replacement key(s) is(are) transferred to target 13 to replace traffic key(s) 19. This transmission of the replacement keys is performed in the clear (not encrypted) since there is a direct wireline connection 15.

The same source 11 is also used to update similar traffic keys in targets 12 and 14. However, different cables 16 and 18 are needed for targets 12 and 14, respectively. This creates a problem in having to maintain a supply of a myriad of cables to be able to handle different targets.

Figure 2:
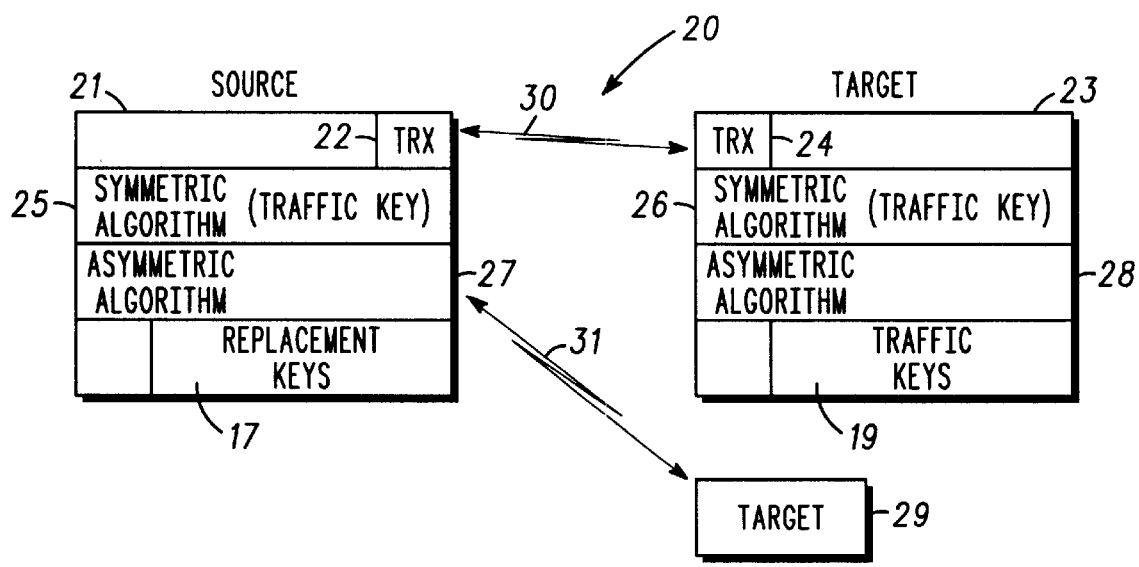
FIG. 2 is a block diagram of system capable of utilizing the present invention.

In FIG. 2, a block diagram a system, generally designated 20, capable of utilizing the present invention is illustrated. System 20 consists primarily of a source 21 and a target 23. Source 21 and target 23 comprise wireless transceivers (TRX) 22 and 24, respectively. Source 21 and target 23 each also contain symmetrical encryption algorithms 25 and 26 as well as asymmetrical encryption algorithms 27 and 28. Source 21 also contains the replacement encryption keys 17 while target 23 contains the traffic keys 19.

A wireless interconnect is established between source 21 and target 23 over link 30. The replacement keys are transferred from source 21 to target 23 using the method described in more detail in the flow chart of FIG. 3

Figure 3:
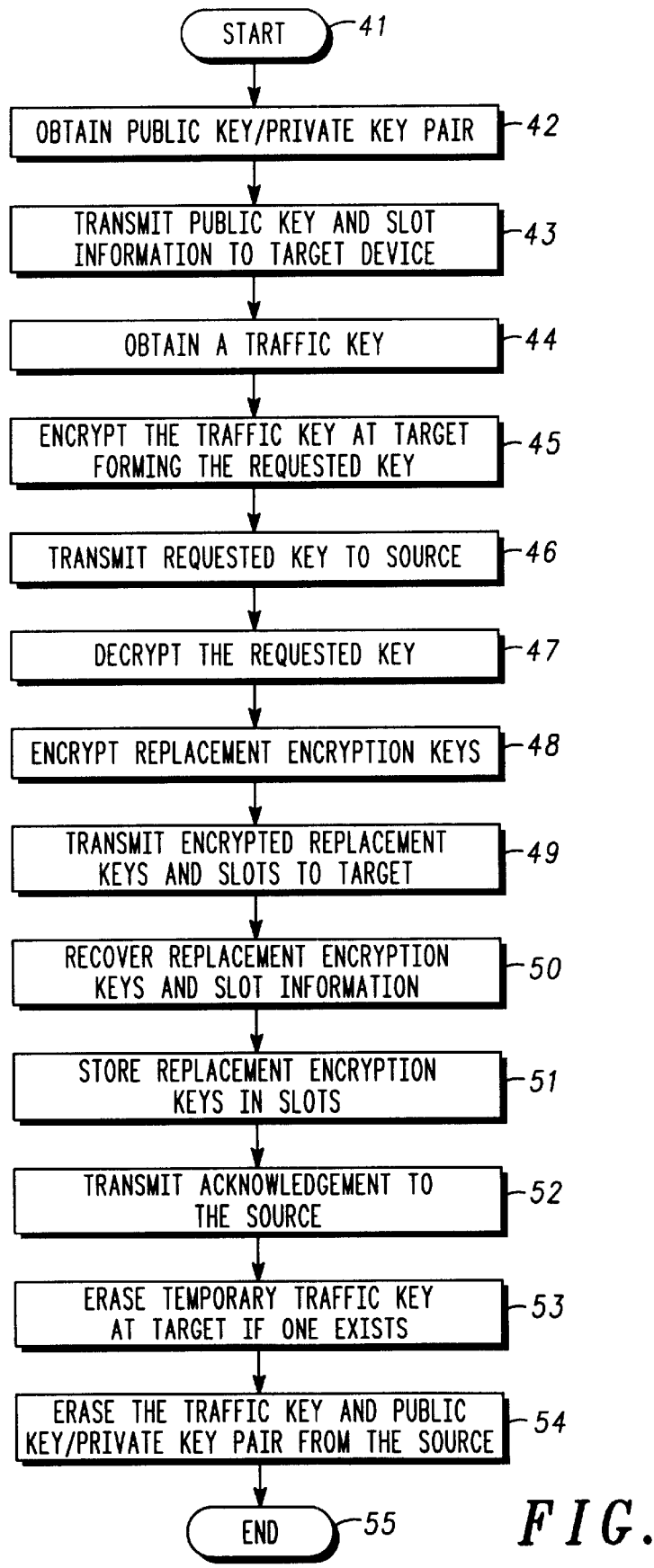
FIG. 3 is a flow chart illustrating a method for transferring an encryption key.

FIG. 3 is a flow diagram illustrating a method, generally designated 40, for transferring a replacement encryption key. Method 40 starts at step 41 and proceeds to step 42 where a public key is obtained. The public key is actually a public key/private key pair which is generated in the source using one of various publicly available methods. This public key/private key pair may be generated using, as an example, portions of a random key stroke file; a real time clock; and/or the output of a linear feedback shift register (LFSR). The public key portion and list of slots are then transmitted from the source device to the target device, step 43. The slot information is sent to the target device as a means of suggesting a traffic key to be used in the reply message. This transmittal is, in one example, in the form of a request for key message.

The target then obtains a traffic key, step 44. This traffic key is used as the session encryption key for the communication being established. The traffic key may be obtained by utilizing one of the traffic keys stored in the target device, or by generating a temporary traffic key within said target device in a manner similar to the creation of the public key/private key pair generated in the source device.

The target device then encrypts the traffic key using the public key provided by the source device, step 45, forming a requested key. The requested key is then transmitted to the source, step 46.

The source will then decrypt the received requested key using the private key, step 47. This results in both ends of the link having the same traffic key for communication. The traffic key is then used to encrypt one or more replacement encryption keys, step 48, for transmission to the target. The encrypted replacement keys are then formatted into a message along with slot information to be transmitted to the target. The slot information will identify to the target where the replacement encryption keys are to be stored. This slot information may also be encrypted. The message with the encrypted replacement keys and slot information is then transmitted to the target device, step 49.

Method 40 then recovers the replacement encryption keys and slot information at the target using the traffic key, step 50. The slot information is then used to identify which traffic keys are to be replaced by the replacement encryption keys and the replacement encryption keys are then stored in those locations, step 51.

An acknowledge is then transmitted from the target to the source, step 52, indicating to the source that the encrypted replacement keys were received. If the traffic key was generated within the target device as a temporary traffic key, then the temporary traffic key will be erased at the target, step 52, once the acknowledge is sent. If the target device had chosen a traffic key from its list of stored keys, then the traffic key is not erased at this time; but may have been overwritten by a replacement encryption key during the above process. Upon receipt of the acknowledge, the source will erase the traffic key as well as the public key/private key pair, step 53. Method 40 then ends, step 55.

Figure 4:
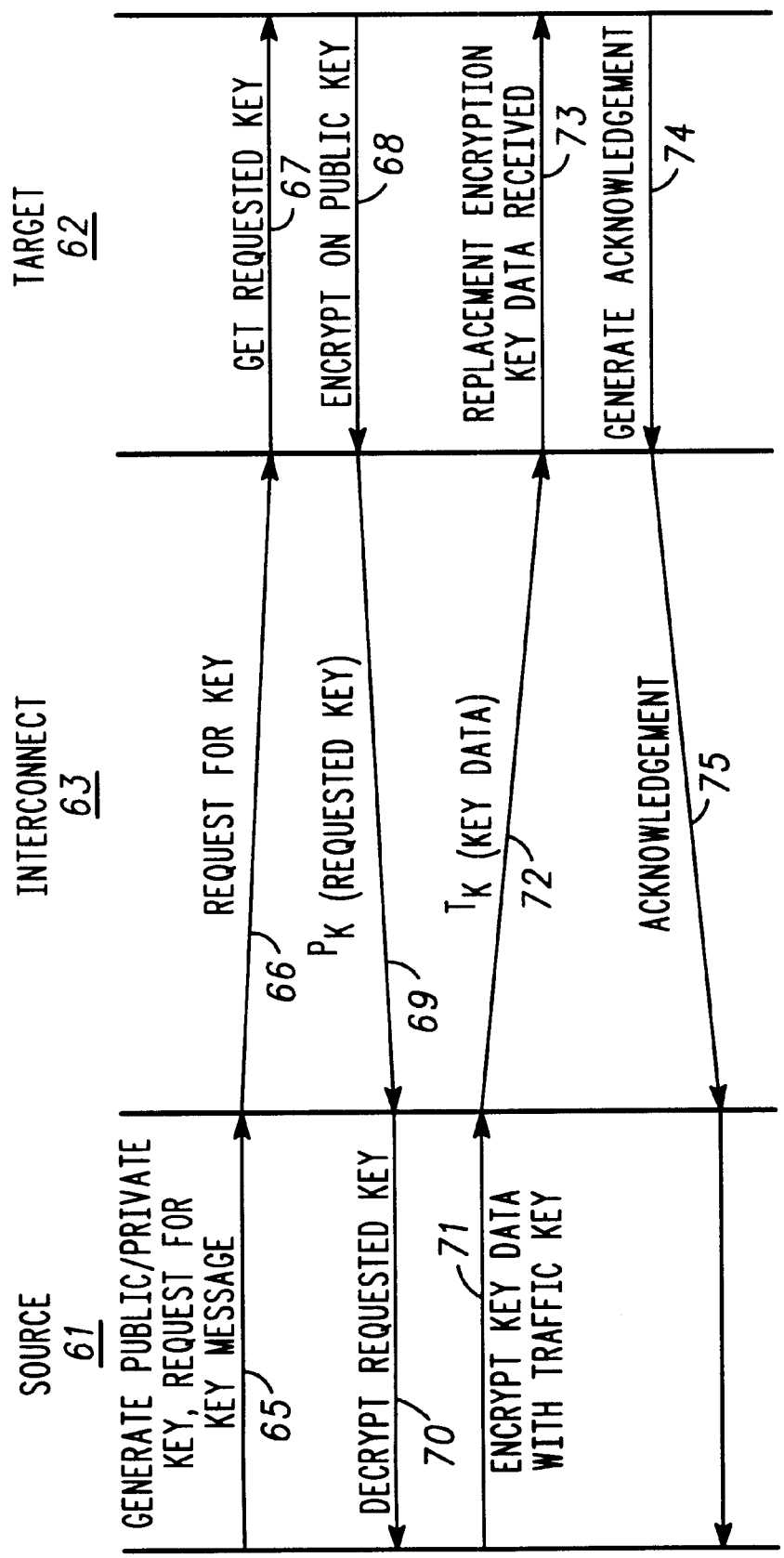
FIG. 4 is a call flow diagram illustrating a method for transferring an encrypted key.

Another illustration of a method utilizing the present invention is in the call flow diagram, generally designated 60, of FIG. 4. FIG. 4 shows the processing of a source 61, a target 62, and an interconnect 63, which, as illustrated here, will also function over a wireline interconnect as well as a wireless interconnect. The message flow 60 begins at 65 with the generation of the public/private key pair and placing the public key in a request-for-key message. The request-for-key is then transmitted over interface 63 to target 62, step 66. Target 62 then retrieves the requested traffic key, step 67. The traffic key is encrypted using the public key and placed in a Pk(requested-key) message, step 68. The Pk(requested-key) message is then transmitted by target 62 to source 61 at step 69. Source 61 decrypts the received Pk(requested-key) message to obtain the traffic key, step 70. The replacement encryption key(s) is(are) then encrypted into a Tk(key data) message by source 61, step 71. The Tk(key data) is then transmitted to target 62, step 72. The received Tk(key data) is decrypted by target 62 and the replacement encryption key data is received, step 73, and stored in the appropriate traffic key slots.

An acknowledge (ACK) is then generated by target 62, step 74, and transmitted to source 61, step 75. The target device may then erase the traffic and private keys used and the source may erase the public, private, and traffic keys used.

The processes described in FIGS. 3 and 4 illustrate the use of the present invention to permit secure transfer of encryption keys over an open interface in a manner which does not compromise the integrity of the encryption keys being transferred.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method for transferring a replacement encryption key, said method comprising the steps of:
   transmitting a non-encrypted public key from a source device to a target device;
   selecting, by said target device, a traffic key from among two or more traffic keys that have been concurrently pre-stored in a memory of the target device;
   encrypting only the traffic key within said target device using only said public key thereby forming a requested key;
   transmitting said requested key to said source device;
   encrypting said replacement encryption key using said traffic key at said source device forming an encrypted replacement key;
   transmitting said encrypted replacement key to said target device;
   recovering said replacement encryption key; and
   using the replacement encryption key to encrypt a message.

2. The method of claim 1 wherein said method further comprises the step of generating said public key and a private key in said source device.

3. The method of claim 2 wherein said public key and said private key are generated using a data set.

4. The method of claim 3 wherein said data set comprises at least a portion of one of a key stroke file, a real time clock, and an output from a linear feedback shift register.

5. The method of claim 2 wherein said method further comprises the step of decrypting said requested key using said private key at said source device.

6. The method of claim 1 wherein said method further comprises the step of receiving said encrypted replacement key at said target device.

7. The method of claim 1 wherein said step of transmitting said public key transmits said public key using at least one of a wired connection, a radio frequency connection, and an infrared connection.

8. The method of claim 1 wherein said step of transmitting said public key comprises the step of transmitting said public key in a message.

9. The method of claim 8 wherein said step of transmitting said requested key comprises the step of transmitting said requested key in a message.

10. The method of claim 11 wherein said message further comprises a key slot within said target device to be used to identify a location for storage of said replacement encryption key.

11. The method of claim 2 wherein said method further comprises the step of acknowledging receipt of said encrypted replacement key by said target device.

12. The method of claim 11 wherein said method further comprises the steps of:
    erasing said traffic key from said source device; and
    erasing said public key and said private key from said source device.

13. A method for transferring a replacement encryption key, said method comprising the steps of:
    obtaining a non-encrypted public key and a private key from a source device;
    transmitting said non-encrypted public key from said source device to a target device;
    selecting, by said target device, a traffic key from among two or more traffic keys that have been concurrently pre-stored in a memory of the target device;
    encrypting only a traffic key within said target device using only said public key thereby forming a requested key;
    transmitting said requested key to said source device;
    dedecrypting said requested key using said private key at said source device;
    encrypting said replacement encryption key using said traffic key at said source device forming an encrypted replacement key;
    transmitting said encrypted replacement key to said target device;
    recovering said replacement encryption key;
    storing said replacement encryption key at said target device; and
    using the replacement encryption key to encrypt a message.

14. The method of claim 13 wherein the step of transmitting said encrypted replacement key comprises a message identifying at least one replacement key and a storage location for each replacement encryption key.

15. The method of claim 13 wherein the step of recovering said replacement encryption key comprises the step of decrypting said encrypted replacement key at said target device using said traffic key.

16. The method of claim 13 further comprising the steps of:
   acknowledging receipt of said encrypted replacement key by said target device;
   erasing said traffic key from said source device and said target device; and
   erasing said public key and said private key from said source device.

17. A method for transferring a plurality of replacement encryption keys, said method comprising the steps of:
   obtaining a non-encrypted public key and a private key from a source device;
   transmitting said public key from said source device to a target device;
   selecting, by said target device, a traffic key from among two or more traffic keys that have been concurrently pre-stored in a memory of the target device;
   encrypting only a traffic key within said target device using only said public key thereby forming a requested key;
   transmitting said requested key to said source device;
   decrypting said requested key using said private key at said source device;
   encrypting said plurality of replacement encryption keys using said traffic key at said source device forming an encrypted replacement key message which further contains a target slot identification for each of said plurality of replacement encryption keys;
   transmitting said encrypted replacement key message to said target device;
   recovering said plurality of replacement encryption keys from said encrypted replacement key message;
   storing said plurality of replacement encryption keys at said target device in a target slot identified for each of said plurality of replacement encryption keys; and
   using one of said plurality of replacement encryption key to encrypt a message.

* * * * *

UNITED STATES PATENT AND TRADEMARK OFFICE
CERTIFICATE OF CORRECTION

PATENT NO.    : 6,393,127 B2
DATED         : May 21, 2002
INVENTOR(S)   : Dean H. Vogler It is certified that error appears in the above-identified patent and that said Letters Patent is hereby corrected as shown below:

<u>Column 4,</u>
Lines 30-33, please change claim 10 from "The method of claim 11 wherein said message further comprises a key slot within said target device to be used to identify a location for storage of said replacement encryption key." to -- The method of claim 9 wherein said message further comprises a key slot within said target device to be used to identify a location for storage of said replacement encryption key. --

Signed and Sealed this

Twentieth Day of May, 2003

JAMES E. ROGAN
*Director of the United States Patent and Trademark Office*